United States Patent
Sakai

(10) Patent No.: US 11,321,897 B2
(45) Date of Patent: May 3, 2022

(54) METHOD FOR GENERATING VIDEO DATA, VIDEO DATA GENERATION DEVICE, AND PROGRAM

(71) Applicant: SEIKO EPSON CORPORATION, Tokyo (JP)

(72) Inventor: Toshiyuki Sakai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/104,516

(22) Filed: Nov. 25, 2020

(65) Prior Publication Data

US 2021/0158592 A1    May 27, 2021

(30) Foreign Application Priority Data

Nov. 26, 2019  (JP) .............................. JP2019-212996

(51) Int. Cl.
*G06T 13/40* (2011.01)
*G06T 13/80* (2011.01)
*G06T 7/246* (2017.01)

(52) U.S. Cl.
CPC .............. *G06T 13/40* (2013.01); *G06T 7/246* (2017.01); *G06T 13/80* (2013.01)

(58) Field of Classification Search
CPC .......... G06T 13/40; G06T 13/80; G06T 7/246
See application file for complete search history.

(56) References Cited

U.S. PATENT DOCUMENTS

| 2012/0086718 A1* | 4/2012 | Schreiber | G06T 13/00 345/582 |
| 2019/0371071 A1* | 12/2019 | Lyons | G06T 19/006 |
| 2021/0073290 A1* | 3/2021 | Hunter | G06N 3/08 |

FOREIGN PATENT DOCUMENTS

JP      2010-092402      4/2010

* cited by examiner

*Primary Examiner* — Samantha (Yuehan) Wang
(74) *Attorney, Agent, or Firm* — Dority & Manning, P.A.

(57) ABSTRACT

An information processing device generating video data representing a video of a moving object in response to an instruction by a user includes a decision unit, a determination unit, a generation unit, and a warning unit. The decision unit decides a movement path of the object, based on an instruction by the user. The determination unit determines whether an object video showing the object moving along the movement path decided by the decision unit is equivalent to a video for repeated playback or not, based on the movement path. The generation unit generates video data based on the object video when the object video is determined by the determination unit as equivalent to the video for repeated playback. The warning unit warns the user when the object video is determined by the determination unit as not equivalent to the video for repeated playback.

5 Claims, 6 Drawing Sheets

METHOD FOR GENERATING VIDEO DATA, VIDEO DATA GENERATION DEVICE, AND PROGRAM

The present application is based on, and claims priority from JP Application Serial Number 2019-212996, filed Nov. 26, 2019, the disclosure of which is hereby incorporated by reference herein in its entirety.

BACKGROUND

1. Technical Field

The present disclosure relates to a method for generating video data, a video data generation device, and a program.

2. Related Art

JP-A-2010-92402 describes an animation preparation device generating video data of a video in which an object such as a character moves. On receiving an instruction from a user about a movement to be executed by a character, the animation preparation device described in JP-A-2010-92402 generates video data of a video showing the character executing the movement.

Signage or the like may need to display a video for a long period of time at the same place. A video that can be displayed for a long period of time involves a heavy load of data preparation and has a large amount of data. To cope with this, short-time video data is prepared and the video represented by this video data is played repeatedly. In the video that is repeatedly played, it is preferable that the first image and the last image are seamlessly connected together. In the description below, the video in which the first image and the last image are seamlessly connected together is referred to as a video for repeated playback. According to the related art, there has been no technique for easily preparing a video for repeated playback.

SUMMARY

A method for generating video data according to an aspect of the present disclosure is a method for generating video data representing a video of a moving object. The method includes: deciding a movement path of the object, based on an instruction by a user; determining whether an object video showing the object moving along the movement path is equivalent to a video for repeated playback or not, based on the movement path; generating video data based on the object video when the object video is determined as equivalent to the video for repeated playback; and warning the user when the object video is determined as not equivalent to the video for repeated playback.

A video data generation device according to another aspect of the present disclosure is a video data generation device that generates video data representing a video of a moving object. The video data generation device includes: a decision unit deciding a movement path of the object, based on an instruction by a user; a determination unit determining whether an object video showing the object moving along the movement path decided by the decision unit is equivalent to a video for repeated playback or not, based on the movement path; a generation unit generating video data based on the object video when the object video is determined by the determination unit as equivalent to the video for repeated playback; and a warning unit warning the user when the object video is determined by the determination unit as not equivalent to the video for repeated playback.

A non-transitory computer-readable storage medium according to still another aspect of the present disclosure stores a program that causes a computer to function as: a decision unit deciding a movement path of a moving object in a video of the object, based on an instruction by a user; a determination unit determining whether an object video showing the object moving along the movement path is equivalent to a video for repeated playback or not, based on the movement path; a generation unit generating video data based on the object video when the object video is determined by the determination unit as equivalent to the video for repeated playback; and a warning unit warning the user when the object video is determined by the determination unit as not equivalent to the video for repeated playback.

DESCRIPTION OF EXEMPLARY EMBODIMENTS

An embodiment of the present disclosure will now be described with reference to the drawings. The embodiment described below includes various technically preferable limitations. However, the embodiment of the present disclosure is not limited to the fore described below.

1. Embodiment

Figure 1:
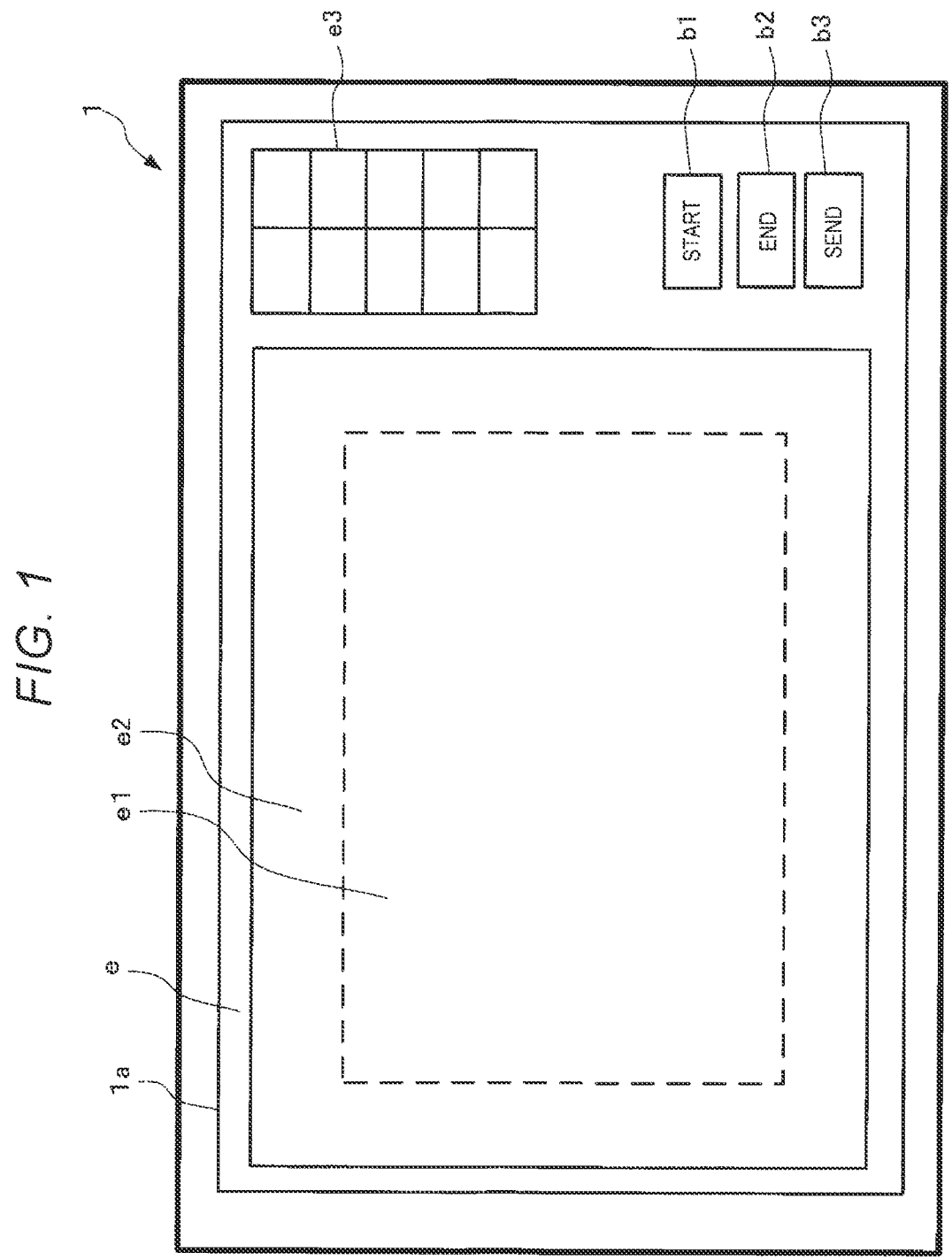
FIG. 1 shows an information processing device 1 according to an embodiment of the present disclosure.

FIG. 1 shows an information processing device 1 according to an embodiment of the present disclosure. In FIG. 1, a smartphone is shown as an example of the information processing device 1. The information processing device 1 is not limited to a smartphone. The information processing device 1 may be, for example, a PC (personal computer) or tablet terminal.

The information processing device 1 includes a display surface 1a displaying various images. The display surface 1a shown in FIG. 1 displays an operation screen e. The information processing device 1 generates video data of a video showing a movement of an object such as a character, based on an operation on the display surface 1a.

The video represented by the video data is repeatedly displayed, for example, by a display device such as a projector. When the first image of the video represented by the video data and the last image of the video satisfy a predetermined condition, a person viewing the video is highly likely to recognize the video as a video for repeated playback. A video for repeated playback is used, for example, for a product advertisement or for a light effect to create a certain impression of a product. The information processing device 1 is a device for easily preparing a video for repeated playback.

A first example of the predetermined condition is that the position and direction of the object in the first image of the video coincide with the position and direction of the object in the last image. A second example of the predetermined condition is that the object moves into a display area from outside the display area at the beginning of the video and moves out of the display area from inside the display area at the end of the video.

As an example of a video satisfying the condition in the second example, a video in which an object moves into a display area from the left outer side of the display area at the beginning of the video and moves out of the display area from the right end side of the display area at the end of the video is considered. As this video is repeatedly played, a person viewing the video receives an impression that, at the junction of the repeatedly player video, the object appears in the display area again after moving behind the display area. Therefore, the person is highly likely to recognize this video as a video for repeated playback.

Figure 2:
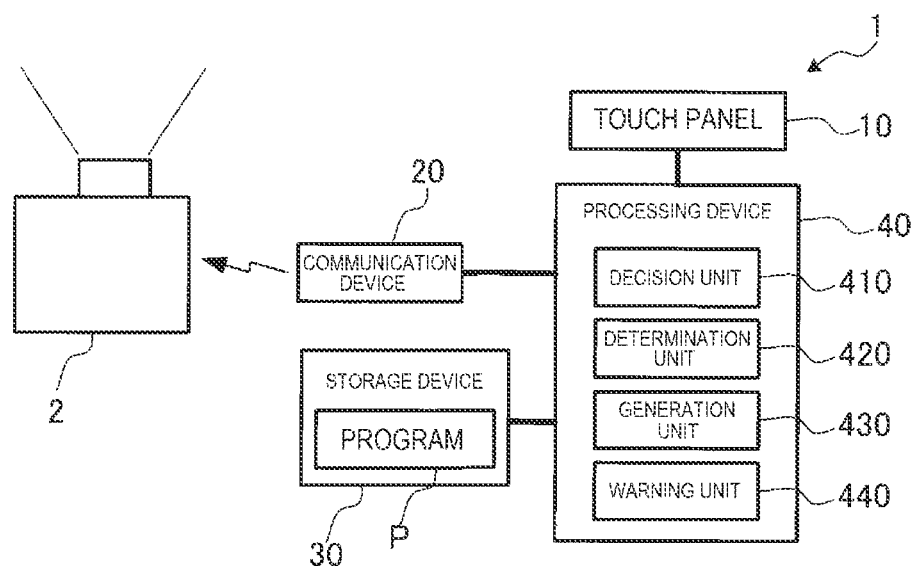
FIG. 2 shows a configuration example of the information processing device 1.

FIG. 2 shows an example of the information processing device 1. The information processing device 1 includes a touch panel 10, a communication device 20, a storage device 30, and a processing device 40.

The touch panel 10 is a device in which a display device displaying an image and an input device accepting an operation by a user are integrated together. The touch panel 10 includes the display surface 1a. The touch panel 10 displays various images on the display surface 1a. The touch panel 10 detects a touch position, using an electrostatic capacitance specified by an object in contact with the touch panel 10 and the touch panel 10.

The communication device 20 communicates with various devices. The communication device 20 communicates, for example, with a projector 2 via a wireless LAN (local area network). The communication device 20 may communicate with a device such as the projector 2 via a different communication form from wireless LAN. A specific example of the different communication form from wireless LAN is wired communication or Bluetooth. Bluetooth is a registered trademark.

The projector 2 is an example of a display device. The display device is not limited to a projector and may be a display, for example, an FPD (flat panel display). The FPD is, for example, a liquid crystal display, plasma display, or organic EL (electroluminescence) display.

The storage device 30 is a recording medium readable to the processing device 40. The storage device 30 includes, for example, a non-volatile memory and a volatile memory. The non-volatile memory is, for example, a ROM (read-only memory), EPROM (erasable programmable read-only memory), or EEPROM (electrically erasable programmable read-only memory). The volatile memory is, for example, a RAM.

The storage device 30 stores a program P executed by the processing device 40. The program P can also be referred to as an "application program", "application software", or "app". The program P is acquired, for example, from a server or the like, not illustrated, via the communication device 20 and is subsequently stored in the storage device 30. The program P may be stored in the storage device 30 in advance. Also, various data referred to or generated in the course of executing the program P are stored in the storage device 30. A specific example of the various data referred to in the course of executing the program P is object data representing an image of an object serving as a component of a video for repeated playback. Although not illustrated in detail in FIG. 2, one or a plurality of object data are stored in the storage device 30 in advance. A specific example of the data generated in the course of executing the program P is video data representing a video for repeated playback.

The processing device 40 includes, for example, a processor such as a CPU (central processing unit). The processing device 40 may be formed of a single processor or a plurality of processors. The processing device 40 starts executing the program P in response to an input giving an instruction to start executing the program P, performed on the touch panel 10. The processing device 40 operating according to the program P functions as a decision unit 410, a determination unit 420, a generation unit 430, and a warning unit 440. The decision unit 410, the determination unit 420, the generation unit 430, and the warning unit 440 in this embodiment are software modules implemented by causing the processing device 40 to operate according to the program P.

The decision unit 410 allows the user to designate an object forming a video by an operation on the touch panel 10 and decides movement path of the object and a direction of the object at each position on the movement path, based on an instruction inputted via the touch panel 10. More specifically, the decision unit 410 causes the operation screen e shown in FIG. 1 to be displayed on the display surface 1a. The operation screen e is a screen for prompting the user to execute an operation to designate an object forming a video and an operation to designate a movement path of the object. As shown in FIG. 1, the operation screen e includes a first area e1, a second area e2 including the first area e1, a third area e3, a virtual operator b1, a virtual operator b2, and a virtual operator b3.

In FIG. 1, the first area e1 corresponds to the display area for an image projected by the projector 2. Of the second area e2, the part that is not the first area e1 is the outside of the display area. The third area e3 is divided into 2 by 5 cells forming a matrix. In each cell, an object corresponding to each of the one or plurality of object data stored in the storage device 30 in advance is displayed on a one-to-one basis. The object displayed in each cell serves as a candidate for a component of a video for repeated playback. The user drags and drops one of the objects displayed in the cells in the third area e3 into the second area e2 by an operation on the touch panel 10 and thus designates an object to serve as a component of a video. As the object is dragged and dropped into the second area e2, the decision unit 410 writes an object identifier representing the object into the volatile memory of the storage device 30.

The virtual operator b1 is a virtual operator for allowing the user to designate a start point of a movement path of an object forming a video. The virtual operator b2 is a virtual operator for allowing the user to designate an end point of a movement path of an object forming a video. The virtual operator b3 is an operator for allowing the user to give an instruction to transmit video data already generated by the processing device 40 to the projector 2.

Figure 3:
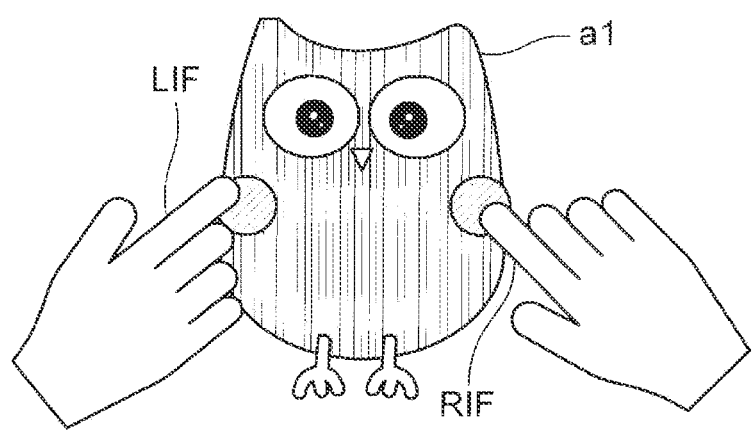
FIG. 3 shows an example of designating two points on an object.

A movement path of an object forming a video and a direction of the object at each position on the movement path are designated in the following manner. The user first designates two points on the object dragged and dropped in the second area e2. As the two points are designated, the decision unit 410 writes reference point information representing the positions of the two points on the object into the volatile memory of the storage device 30. The reference point information is information representing the position of each of the two points in a two-dimensional coordinate system that is preset for the object, such as a two-dimensional coordinate system having the origin at the centroid position of the object. FIG. 3 illustrates the case where an object a1 of an owl character is designated as an object forming a video and where two points are designated by a left index finger LIF and a right index finger RIF.

In this embodiment, a movement path of the object and a direction of the object at each position on the movement path are designated, based on the two points represented by the reference point information. A start point of the movement path is designated by moving the object to a desired position as the start point of the movement, path and subsequently performing a touch operation on the virtual operator b1. As the touch operation on the virtual operator b1 is performed, the decision unit 410 writes information representing the position of a middle point between the two points as of when the touch operation is performed, as start point information representing the position of the start point, into the volatile memory of the storage device 30. The start point information is information representing the position of the start point in a two-dimensional coordinate system having the origin at the top left corner of the second area e2.

Figure 4:
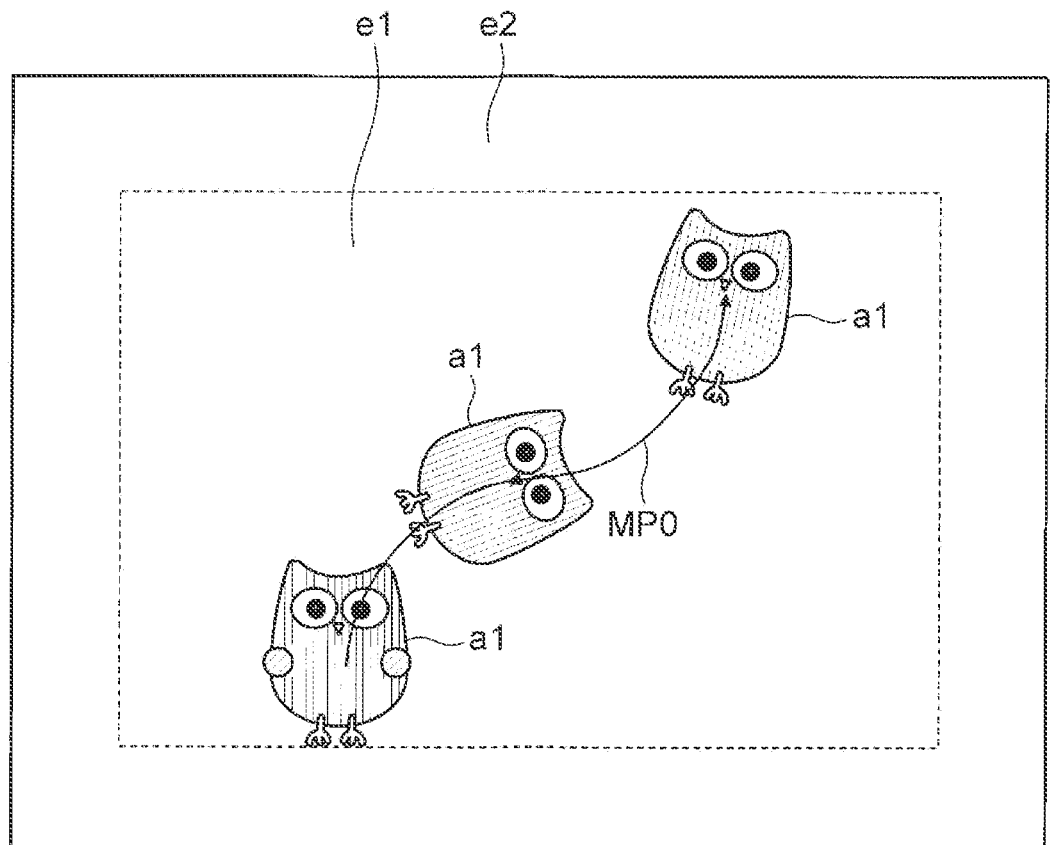
FIG. 4 shows an example of a movement path designated by moving an object while designating two points, and a change in the direction of the object.
Figure 5:
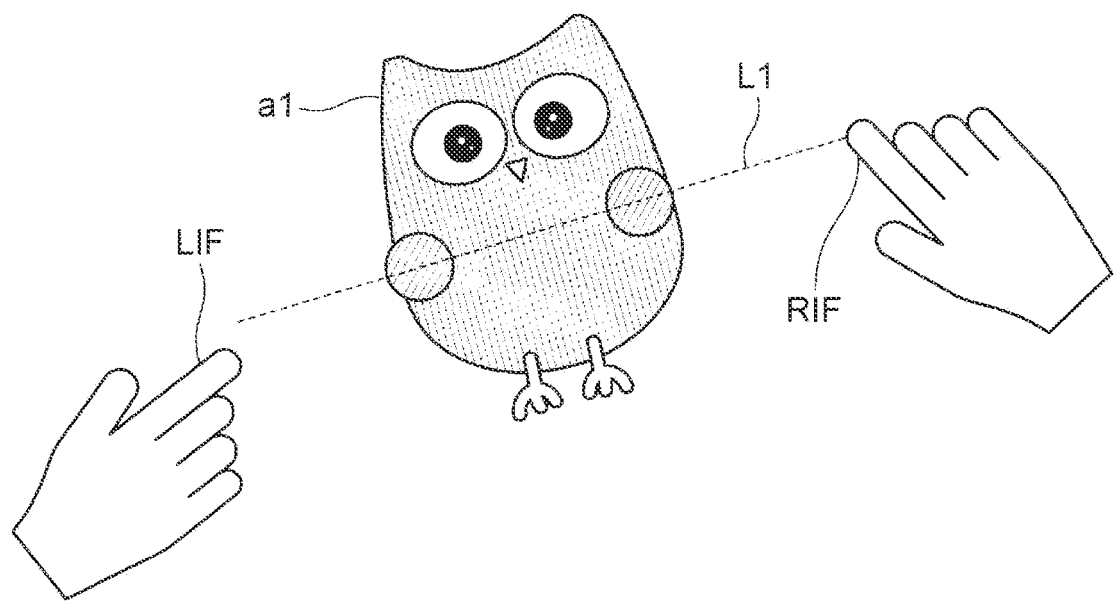
FIG. 5 shows an example of designating two points on an object.

After the start point is designated and until an end point is designated, every time the user performs an operation to move the object within the second area e2 while designating the two points, the decision unit 410 sequentially writes information representing the position of the middle point as movement path information into the volatile memory of the storage device 30. The information represents the position of the middle point in the two-dimensional coordinate system having the origin at the top left corner of the second area e2. The decision unit 410 also sequentially writes angle information representing an amount of rotation of the object about the middle point, that is, an angle formed by a line passing through the two points and the movement path, into the volatile memory of the storage device 30 in association with the movement path information. Based on the angle information, a direction of the object a1 at each position on a movement path MP0 represented by the movement path information is decided, as shown in FIG. 4. When the space between the fingers designating the two points becomes broader as shown in FIG. 5 in the course of moving the object, the decision unit 410 rotates and moves the object a1 in such a way that a line segment L1 connecting the fingers passes through the two points represented by the reference point information and that the middle point of the line segment L1 connecting the fingers coincides with the middle point between the two points represented by the reference point information.

When the object has reached a desired position as an end point of the movement path, the user performs a touch operation on the virtual operator b2 and thus designate the end point of the movement path. As the touch operation on the virtual operator b2 is performed, the decision unit 410 writes information representing the position of the middle point between the two points as of when the touch operation is performed, as end point information representing the position of the end point, into the volatile memory of the storage device 30. The end point information is information representing the position of the end point similarly in the two-dimensional coordinate system having the origin at the top left corner of the second area e2. Based on the start point information, the movement path information, the angle information, and the end point information written in the volatile memory of the storage device 30 in the foregoing manner, the movement path of the object and the direction of the object at each position on the movement path are decided.

The determination unit 420 determines whether an object video showing the object moving along the movement path decided by the decision unit 410 is equivalent to a video for repeated playback or not, based on the movement path, or based on the movement path and the direction of the object at each position on the movement path. More specifically, when the movement path and the direction of the object decided by the decision unit 410 satisfy the condition in the foregoing first example, or when the movement path decided by the decision unit 410 satisfies the condition in the foregoing second example, the determination unit 420 determines that the object video is equivalent to a video for repeated playback.

The generation unit 430 generates video data based on the object video, when the object video is determined as equivalent to a video for repeated playback by the determination unit 420. The generation unit 430 generates video data representing a video in which the object represented by the object identifier moves along the movement path represented by the movement path information from the start point represented by the start point information to the end point represented by the endpoint information while rotating by the angle represented by the angle information corresponding to each position.

The warning unit 440 warns the user when the object video is determined as not equivalent to a video for repeated playback by the determination unit 420. More specifically, the warning unit 440 causes the display device of the touch panel 10 to display a warning message showing that the object video is not equivalent to a video for repeated playback. In this embodiment, the user is warned via the display of a warning message. However, when the information processing device 1 has an audio output device, the user may be warned via an output of a speech reading aloud the words of a warning message. The warning message may be a message communicating a condition for a video for repeated playback to the user. A specific example of the message communicating a condition for a video for repeated playback to the user is "Set the start point and end point of the movement path of the object outside the display area," or "Match up the start point and end point of the movement path of the object and match up the direction of the object, too," or the like.

Figure 6:
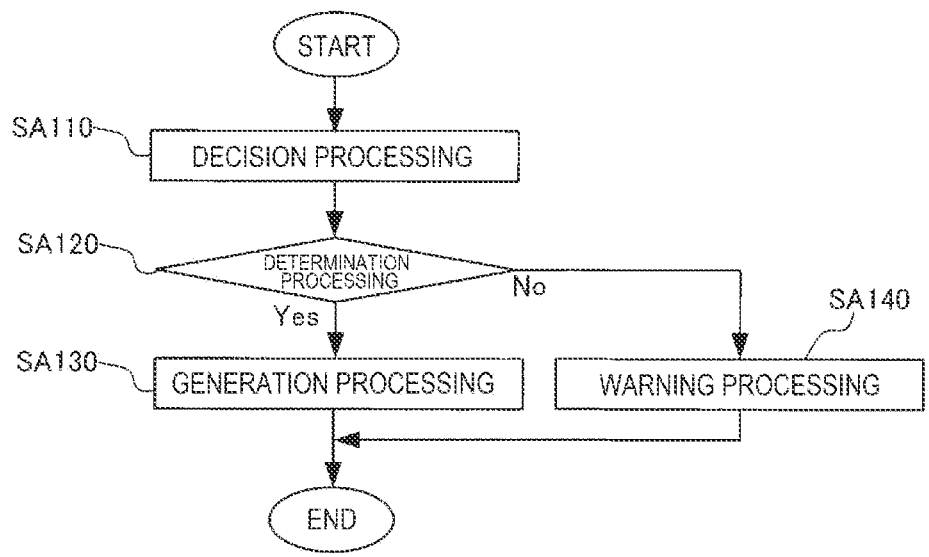
FIG. 6 is a flowchart showing a flow of a method for generating video data executed by a processing device 40 according to a program P in the information processing device 1.

The processing device 40 operating according to the program P executes the method for generating video data according to the present disclosure. FIG. 6 is a flowchart showing the flow of the method for generating video data executed by the processing device 40 according to the program P. As shown in FIG. 6, the method for generating video data according to the present disclosure includes decision processing SA110, determination processing SA120, generation processing SA130, and warning processing SA140.

In the decision processing SA110, the processing device 40 functions as the decision unit 410. In the decision processing SA110, the processing device 40 allows the user to designate an object to be component of a video by an operation on the touch panel 10 and decides a movement path of the object and a direction of the object at each position on the movement path, based on an operation to move the object within the second area e2 while designating two points on the object.

In the determination processing SA120, the processing device 40 functions as the determination unit 420. In the determination processing SA120, the processing device 40 determines whether an object video representing the object moving along the movement path decided in the decision processing SA110 is equivalent to a video for repeated playback or not, based on the movement path, or based on the movement path and the direction of the object at each position on the movement path. Specifically, the processing device 40 determines that the object video is equivalent to a video for repeated playback, when the positions of the start point and end point of the movement path decided in the decision processing SA110 satisfy the condition in the second example, or when the positions of the start point and end point and the direction of the object at the start point and end point satisfy the condition in the first example. As shown in FIG. 6, when the result of the determination in the determination processing SA120 is "Yes", that is, when the object video is determined as equivalent to a video for repeated playback, the processing device 40 executes the generation processing SA130. Meanwhile, when the result of the determination in the determination processing SA120 is "No", that is, when the object video is determined as not equivalent to a video for repeated playback, the processing device 40 executes the warning processing SA140.

In the generation processing SA130, the processing device 40 functions as the generation unit 430. In the generation processing SA130, the processing device 40 generates video data based on the object video. In the warning processing SA140, the processing device 40 functions as the warning unit 440. In the warning processing SA140, the processing device 40 displays a warning message that the object video is not equivalent to a video for repeated playback, on the touch panel 10.

Figure 7:
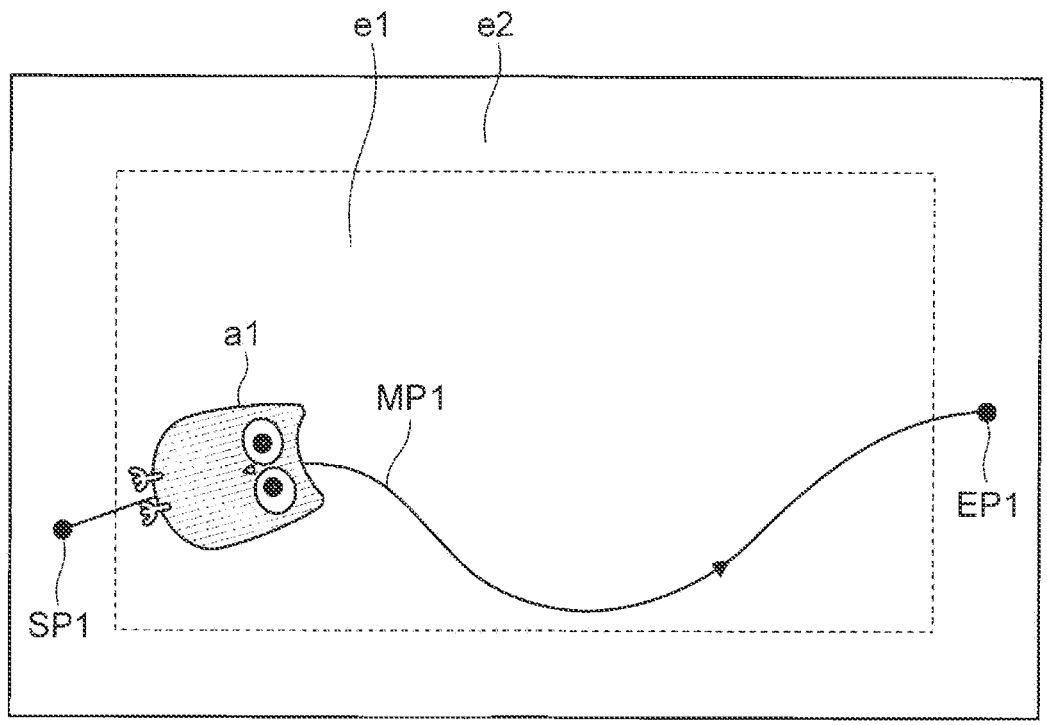
FIG. 7 shows an example of a movement path of an object in an object video that is equivalent to a video for repeated playback.
Figure 8:
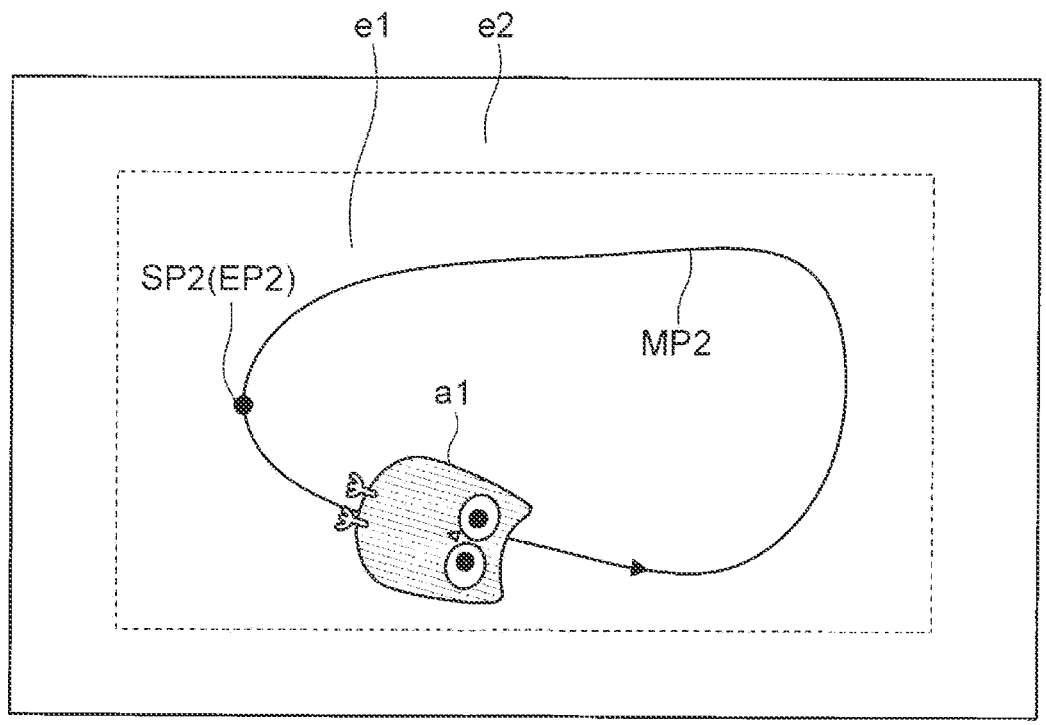
FIG. 8 shows an example of a movement path of an object in an object video that can be equivalent to a video for repeated playback.

For example, it is assumed that in the decision processing SA110, a movement path MP1 in which both of a start point SP1 and an end point EP1 are located in an area that is different from the first area e1 in the second area e2, as shown in FIG. 7, is decided. In this case, since the condition in the second example is satisfied, the result of the determination in the determination processing SA120 is "Yes" and the generation processing SA130 is executed. Thus, video data representing a video in which the object a1 moves along the movement path MP1 shown in FIG. 7 is generated. It is now assumed that in the decision processing SA110, a movement path MP2 in which both of a start point SP2 and an end point EP2 are located in the first area e1 and in which the start point EP2 and the end point EP2 coincide with each other, as shown in FIG. 8, is decided. In this case, when the direction of the object a1 at the start point SP2 and the direction of the object a1 at the end point EP2 coincide with each other, the result of the determination in the determination processing SA120 is "Yes" and video data representing a video in which the object a1 moves along the movement path MP2 shown in FIG. 3 is generated. The video data generated in the generation processing SA130 is transmitted to the projector 2 via the communication device 20 when a touch operation on the virtual operator b3 is performed. The projector 2 stores the video data transmitted from the information processing device 1 and displays the video represented by the video data according to the stored video data.

Figure 9:
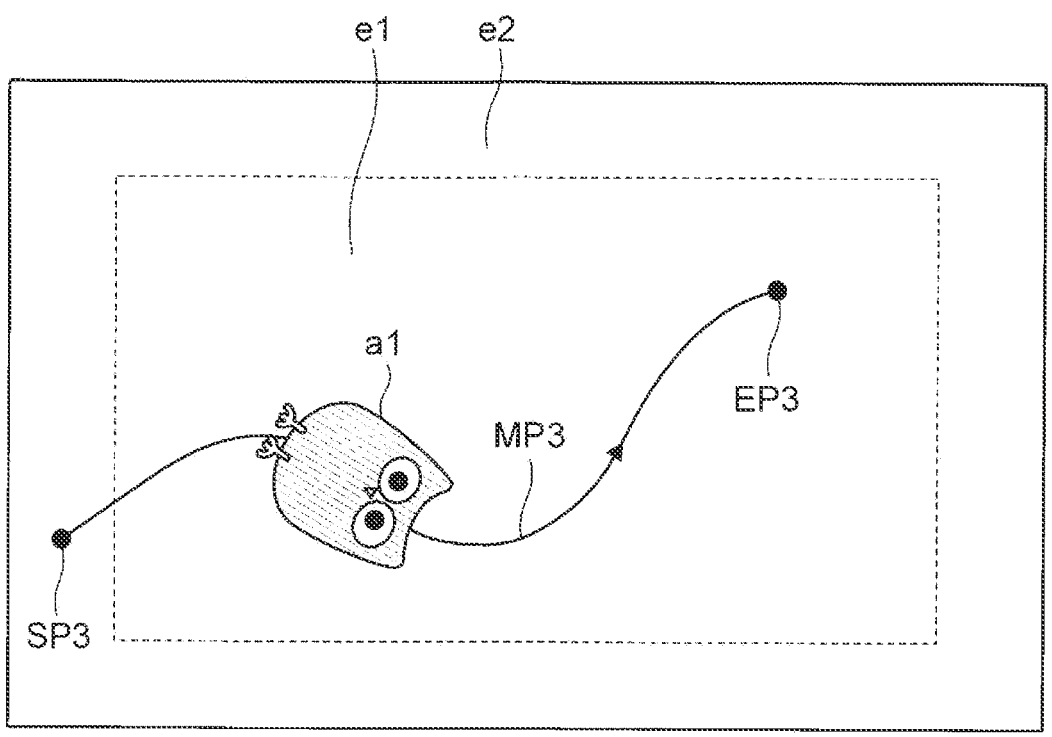
FIG. 9 shows an example of a movement path of an object in an object video that is not equivalent to a video for repeated playback.
Figure 10:
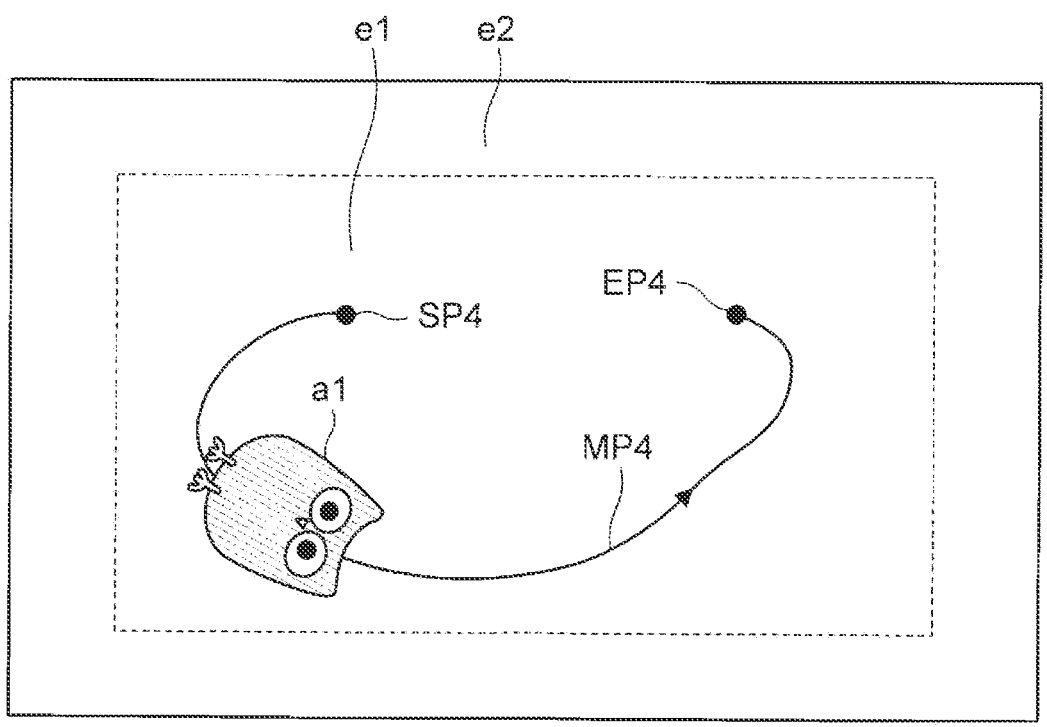
FIG. 10 shows an example of a movement path of an object in an object video that is not equivalent to a video for repeated playback.

Meanwhile, even when the movement path MP2 shown in FIG. 8 is decided in the decision processing SA110, when the direction of the object a1 at the start point SP2 and the direction of the object a1 at the end point EP2 do not coincide with each other, the condition in the first example is not satisfied and the result of the determination in the determination processing SA120 is "No". In this case, the warning processing SA140 is executed. Also, when a movement path MP3 in which a start point SP3 is located in an area that is different from the first area e1 in the second area e2, and in which an end point EP3 is located in the first area e1, as shown in FIG. 9, is decided in the decision processing SA110, the result of the determination in the determination processing SA120 is "No" and the warning processing SA140 is executed. The same applies to when a movement path MP4 in which both of a start point SP4 and an end point EP4 are located in the first area e1 but in which the two points do not coincide with each other, as shown in FIG. 10, is decided. In these cases, video data is not generated, but the user can correct the movement path or the direction of the object according to the content of the warning so as to prepare video data representing a video for repeated playback.

As described above, with the information processing device 1 according to this embodiment, a video for repeated playback can be easily prepared by designating a movement path and direction of an object in such a way as to satisfy the condition in the first example or by designating a movement path of an object in such as way as to satisfy the condition in the second example. Also, with the information processing device 1 according to this embodiment, the user can simultaneously designate a movement path of an object and a direction of the object at each position on the movement path by performing an operation to move the object within the second area e2 while designating two points on the object located in the second area e2.

2. Modification Examples

Modifications described below may be suitably combined with the embodiment.

(1) In the embodiment, the object video is equivalent to a video for repeated playback when the start point and the end point are designated within the display area and coincide with each other and the direction of the object at the start point and the direction of the object at the end point coincide with each other, or when the start point and the end point are designated outside the display area. However, when the distance between the start point and the end point is shorter than a first threshold, the start point and the end point may be regarded as coinciding with each other. This is because, if the first threshold is properly defined based on an experiment or the like, the image at the beginning and the image at the end can be seamlessly connected together even in a video in which the distance between the start point and the end point is shorter than the first threshold. Similarly, when the difference between an angle designating the direction of the object at the start point and an angle designating the direction of the object at the end point is smaller than a second threshold, the direction of the object at the start point and the direction of the object at the end point may be regarded as coinciding with each other.

(2) In the embodiment, the user is allowed to designate a movement path of the object and a direction of the object moving along the movement path in a video. However, the designation of the direction of the may be omitted and the user may be allowed to designate only the movement path. This is because the image at the beginning and the image at the end of the video can seamlessly connected together even when the designation of the direction of the object is omitted. In the configuration where the user is allowed to designate only the movement path of the object in this way, the determination unit 420 may determine that the object video is equivalent to a video for repeated playback when both of the start point and the end point are designated outside the display area, or when the distance between the start point designated within the display area and the end point designated within the display area is shorter than the first threshold. Also, in the configuration where the user is allowed to designate only the movement path of the object, the movement path of the object may be decided according to an operation to move the object while designating one point on the object with one finger. This configuration enables the designation of the movement path of the object by an easier and more natural operation than in the embodiment. Also, a movement path of the object may be decided first and a direction of the object may be subsequently designated at a plurality of positions on the movement path. In this case, the direction of the object at a position where the direction of the object is not designated may be decided by interpolation.

(3) In the embodiment, the program P causing the processing device 40 to function as the decision unit 410, the determination unit 420, the generation unit 430, and the warning unit 440 is already stored in the storage device 30. However, the program P may be manufactured or distributed as it is. A specific method for distributing the program P may be writing the program in a computer-readable recording medium such as a flash ROM (read-only memory) and distributing the program in this form, or downloading the program via a telecommunications network such as the internet and distributing the program. Installing the program in a general information processing device and causing the computer of the information processing device to operate according to the program enables this information processing device to function as the information processing device 1 according to the embodiment.

(4) The decision unit 410, the determination unit 420, the generation unit 430, and the warning unit 440 in the embodiment are software modules implemented by causing the processing device 40 to operate according to the program P. However, a part or all of the decision unit 410, the determination unit 420, the generation unit 430, and the warning unit 440 may be hardware. An example of this hardware is a DSP (digital signal processor), ASIC (application-specific integrated circuit), PLD (programmable logic device), and FPGA (field-programmable gate array). Even when a part or all of the decision unit 410, the determination unit 420, the generation unit 430, and the warning unit 440 are hardware, the same effect as in the embodiment is achieved.

(5) In the embodiment, the information processing device 1 functions as the video data generation device according to the present disclosure. However, a video data generation device having the decision unit 410, the determination unit 420, the generation unit 430, and the warning unit 440 may be manufactured or sold as it is. Incorporating this video data generation device into a general information processing device enables this information processing device to function as the information processing device 1 according to the embodiment. Also, the video data generation device may be incorporated in a server device communicating with the information processing device via a telecommunications network. Alternatively, the server device may be made to function as the video data generation device. In this case, the server device causes the information processing device communicating with the server device via the telecommunications network, to display the operation screen e on the display surface. An operation performed on the operation screen e is communicated from the information processing device to the server device via the telecommunications network. The server device determines whether the video is equivalent to a video for repeated playback or not, based on the operation communicated from the information processing device. When the video is equivalent to a video for repeated playback, the server device generates video data for repeated playback and transmits the generated video data to the information processing device. When the video is not equivalent to a video for repeated playback, the server device transmits a warning message that the video is not equivalent to a video for repeated playback, to the information processing device, and causes the information processing device to output the warning message.

3. Configuration Grasped from at Least One of Embodiment and Modification Examples The present disclosure is not limited to the foregoing embodiment and modification examples and can be implemented in various other configurations without departing from the spirit and scope of the present disclosure. For example, the present disclosure can be implemented in the configurations described below. A technical feature in the embodiment corresponding to a technical feature in each of the configurations described below can be suitably replaced with or combined with another technical feature in order to solve a part or all of the problems to be solved by the present disclosure or in order to achieve a part or all of the effects of the present disclosure. The technical feature can be suitably deleted unless described as essential in this specification.

As one configuration of the method for generating video data according to the present disclosure, a method for generating video data representing a video of a moving object includes decision processing, determination processing, generation processing, and warning processing, described below. In the decision processing, a movement path of the object is decided, based on an instruction by a user. In the determination processing, whether an object video showing the object moving along the movement path is equivalent to a video for repeated playback or not is determined, based on the movement path. The generation processing is executed when the object video is determines as equivalent to the video for repeated playback. In the generation processing, video data based on the object video is generated. The warning processing is executed when the object video is determined as not equivalent to the video for repeated playback. In the warning processing, the user is warned. In this configuration, the user can prepare a video for repeated playback by designating a movement path. When the object video is determined as not equivalent to a video for repeated playback and a warning is given, the user can prepare a video for repeated playback by adjusting the movement path in such a way that a warning is not given. In this way, this configuration enables easy preparation of a video for repeated playback.

In one configuration of the method for generating video data, the movement path in a second area including a first area may be decided, based on the instruction. In this configuration, when both of a start point of the movement path and an end point of the movement path are located in an area that is different from the first area in the second area, or when a distance between the start point located in the first area and the endpoint located in the first area is shorter than a first threshold, the object video may be determined as equivalent to the video for repeated playback. According to this configuration, a video for repeated playback can be prepared by designating the start point and the end point in an area that is different from the first area in the second area or by designating the start point and the end point in the first area within a range such that the distance between the start point and the end point is shorter than the first threshold.

In one configuration of the method for generating video data, a direction of the object moving along the movement path may be decided, based on the instruction. According to this configuration, the user can prepare a video for repeated playback of an object which moves along a movement path and changes in direction with the movement. More specifically, the instruction may be an operation to move the object within the second area while designating two points on the object located in the second area. In this configuration, the direction of the object may be decided, based on an angle formed by a line passing through the two points and the movement path. In this configuration, when the distance between the start point and the end point is shorter than the first threshold and a difference between an angle representing the direction of the object at the start point and an angle representing the direction of the object at the end point is smaller than a second threshold, the object video may be determined as equivalent to the video for repeated playback.

As one configuration of the video data generation device according to the present disclosure, a video data generation device generating video data representing a video of a moving object includes a decision unit, a determination unit, a generation unit, and a warning unit, described below. The decision unit decides a movement path of the object, based on an instruction by a user. The determination unit determines whether an object video showing the object moving along the movement path is equivalent to a video for repeated playback or not, based on the movement path. The generation unit generates video data based on the object video when the object video is determined by the determination unit as equivalent to the video for repeated playback. The warning unit warns the user when the object video is determined by the determination unit as not equivalent to the video for repeated playback. This configuration, too, enables easy preparation of a video for repeated playback.

As one configuration of the program according to the present disclosure, a program causes a computer such as a CPU to function as a decision unit, a determination unit, a generation unit, and a warning unit, described below. The decision unit decides a movement path of a moving object in a video of the object, based on an instruction by a user. The determination unit determines whether an object video showing the object moving along the movement path is equivalent to a video for repeated playback or not, based on the movement path. The generation unit generates video data based on the object video when the object video is determined by the determination unit as equivalent to the video for repeated playback. The warning unit warns the user when the object video is determined by the determination unit as not equivalent to the video for repeated playback. This configuration, too, enables easy preparation of a video for repeated playback.

What is claimed is:

1. A method for generating video data representing a video of a moving object, the method comprising:
   deciding a movement path of the object, based on an instruction by a user;
   determining whether an object video showing the object moving along the movement path is equivalent to a video for repeated playback or not based on the movement path;
   generating video data based on the object video when the object video is determined as equivalent to the video for repeated playback; and
   warning the user when the object video is determined as not equivalent to the video for repeated playback, wherein
   the movement path in a second area including a first area is decided, based on the instruction, and
   when both of a start point of the movement path and an end point of the movement path are located in an area that is different from the first area in the second area, or when a distance between the start point located in the first area and the end point located in the first area is shorter than a first threshold, the object video is determined as equivalent to the video for repeated playback.

2. The method for generating video data according to claim 1, wherein a direction of the object moving along the movement path is decided, based on the instruction.

3. A method for generating video data representing a video of a moving object, the method comprising:
   deciding a movement path of the object, based on an instruction by a user;
   determining whether an object video showing the object moving along the movement path is equivalent to a video for repeated playback or not, based on the movement path;
   generating video data based on the object video when the object video is determined as equivalent to the video for repeated playback; and
   warning the user when the object video is determined as not equivalent to the video for repeated playback, wherein
   a direction of the object moving along the movement path is decided, based on the instruction,
   the instruction is an operation to move the object within an area while designating two points on the object located in the area,
   the direction of the object is decided, based on an angle formed by a line passing through the two points and the movement path, and
   when the distance between the start point and the end point is shorter than the first threshold and a difference between an angle representing the direction of the object at the start point and an angle representing the direction of the object at the end point is smaller than a second threshold, the object video is determined as equivalent to the video for repeated playback.

4. A video data generation device generating video data representing a video of a moving object, the device comprising:
   one or more processors configured to:
      decide a movement path of the object, based on an instruction by a user, determine whether an object video showing the object moving along the movement path is equivalent to a video for repeated playback or not, based on the movement path, generate video data based on the object video when the object video is determined by the determination unit as equivalent to the video for repeated playback, and warn the user when the object video is determined as not equivalent to the video for repeated playback, wherein the movement path in a second area including a first area is decided, based on the instruction, and when both of a start point of the movement path and an end point of the movement path are located in an area that is different from the first area in the second area, or when a distance between the start point located in the first area and the end point located in the first area is shorter than a first threshold, the object video is determined as equivalent to the video for repeated playback.

5. The video data generation device according to claim 4, wherein a direction of the object moving along the movement path is decided, based on the instruction.

* * * * *